United States Patent
Kumar et al.

(10) Patent No.: US 8,762,778 B2
(45) Date of Patent: *Jun. 24, 2014

(54) FIRMWARE ASSISTED ERROR HANDLING SCHEME

(71) Applicant: Intel Corporation, Santa Clara, CA (US)

(72) Inventors: Mohan Kumar, Aloha, OR (US); Sarathy Jayakumar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/891,022

(22) Filed: May 9, 2013

(65) Prior Publication Data

US 2013/0254602 A1    Sep. 26, 2013

Related U.S. Application Data

(63) Continuation of application No. 11/804,105, filed on May 16, 2007, now Pat. No. 8,448,024.

(51) Int. Cl.
*G06F 11/00* (2006.01)

(52) U.S. Cl.
USPC ............... 714/25; 714/37; 714/48; 714/46

(58) Field of Classification Search
USPC ............................... 714/25, 47.1, 48
See application file for complete search history.

(56) References Cited

U.S. PATENT DOCUMENTS

| | | | | |
|---|---|---|---|---|
| 6,128,745 A | * | 10/2000 | Anderson et al. | 713/323 |
| 6,728,668 B1 | * | 4/2004 | Kitamorn et al. | 703/22 |
| 2002/0129186 A1 | * | 9/2002 | Emerson et al. | 710/302 |
| 2006/0085670 A1 | * | 4/2006 | Carver et al. | 714/5 |
| 2006/0112307 A1 | * | 5/2006 | Marisetty et al. | 714/11 |
| 2006/0150009 A1 | * | 7/2006 | Takemori | 714/12 |
| 2006/0253740 A1 | * | 11/2006 | Ritz et al. | 714/38 |
| 2007/0061634 A1 | * | 3/2007 | Marisetty et al. | 714/48 |
| 2008/0005616 A1 | * | 1/2008 | Barlow et al. | 714/30 |
| 2008/0046877 A1 | * | 2/2008 | Ford | 717/168 |
| 2008/0126852 A1 | * | 5/2008 | Brandyberry et al. | 714/8 |
| 2008/0141076 A1 | * | 6/2008 | Hu et al. | 714/45 |

OTHER PUBLICATIONS

Final Office Action mailed Aug. 18, 2011 U.S. Appl. No. 11/804,105.
Non Final Office Action mailed Feb. 16, 2011 U.S. Appl. No. 11/804,105.
Final Office Action mailed Oct. 28, 2010 U.S. Appl. No. 11/804,105.
Non Final Office Action mailed Feb. 2, 2012 U.S. Appl. No. 11/804,105.
Non Final Office Action mailed Sep. 30, 2009 U.S. Appl. No. 11/804,105.
Non Final Office Action mailed Jul. 23, 2012 U.S. Appl. No. 11/804,105.
Final Office Action mailed Apr. 14, 2010 U.S. Appl. No. 11/804,105.
Non Final Office Action mailed Aug. 4, 2010 U.S. Appl. No. 11/804,105.

* cited by examiner

*Primary Examiner* — Sarai Butler
(74) *Attorney, Agent, or Firm* — Blakely, Sokoloff, Taylor & Zafman LLP

(57) ABSTRACT

A firmware assisted error handling scheme in a computer system has been disclosed. In one embodiment, firmware is used to access one or more hardware-specific error registers within the computer system in response to a system management interrupt (SMI) trap. Using the firmware, an error record in a common error record format is constructed. The error record is made available to an operating system (OS) within the computer system.

24 Claims, 4 Drawing Sheets

FIRMWARE ASSISTED ERROR HANDLING SCHEME

CROSS-REFERENCE TO RELATED APPLICATION

This application is a continuation of U.S. patent application Ser. No. 11/804,105, filed May 16, 2007, entitled, "Platform Firmware Assisted Error Handling Scheme", which issued as U.S. Pat. No. 8,448,024 on May 21, 2013.

TECHNICAL FIELD

Embodiments of the invention relate generally to computer systems, and more particularly, to handling errors in computer systems.

BACKGROUND

Conventionally, there are many vendor-specific and/or operating system (OS) specific error handling schemes for computer systems. To adopt a particular one of such schemes, specific modifications have to be made in the hardware or silicon of various computer system components (e.g., central processing unit (CPU), memory controlled input/output (I/O) controller, etc.). It is generally costly and inconvenient to design and manufacture such vendor and/or OS specific hardware.

In an effort to standardize error handling, a common error record format is defined for computer systems. Although the error record format is standardized, access to errors is still performed in vendor and/or OS specific manner (such as discovery, reporting, injection, etc.) in many conventional computer systems. Supporting the error access in a vendor and/or OS specific manner is costly as more silicon gates and platform logic are typically needed. Alternatively, per-platform and/or per-OS device drivers are developed and installed in some conventional computer systems to accommodate the vendor and/or OS specific error handling. However, such per-platform and/or per-OS device drivers typically add maintenance and validation costs to the computer systems.

BRIEF DESCRIPTION OF THE DRAWINGS

Embodiments of the present invention is illustrated by way of example and not limitation in the figures of the accompanying drawings, in which like references indicate similar elements and in which.

DETAILED DESCRIPTION

A firmware assisted error handling scheme is disclosed. In the following detailed description, numerous specific details are set forth in order to provide a thorough understanding. However, it will be apparent to one of ordinary skill in the art that these specific details need not be used to practice some embodiments of the present invention. In other circumstances, well-known structures, materials, circuits, processes, and interfaces have not been shown or described in detail in order not to unnecessarily obscure the description.

Reference in this specification to "one embodiment" or "an embodiment" means that a particular feature, structure, or characteristic described in connection with the embodiment is included in at least one embodiment of the invention. The appearances of the phrase "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
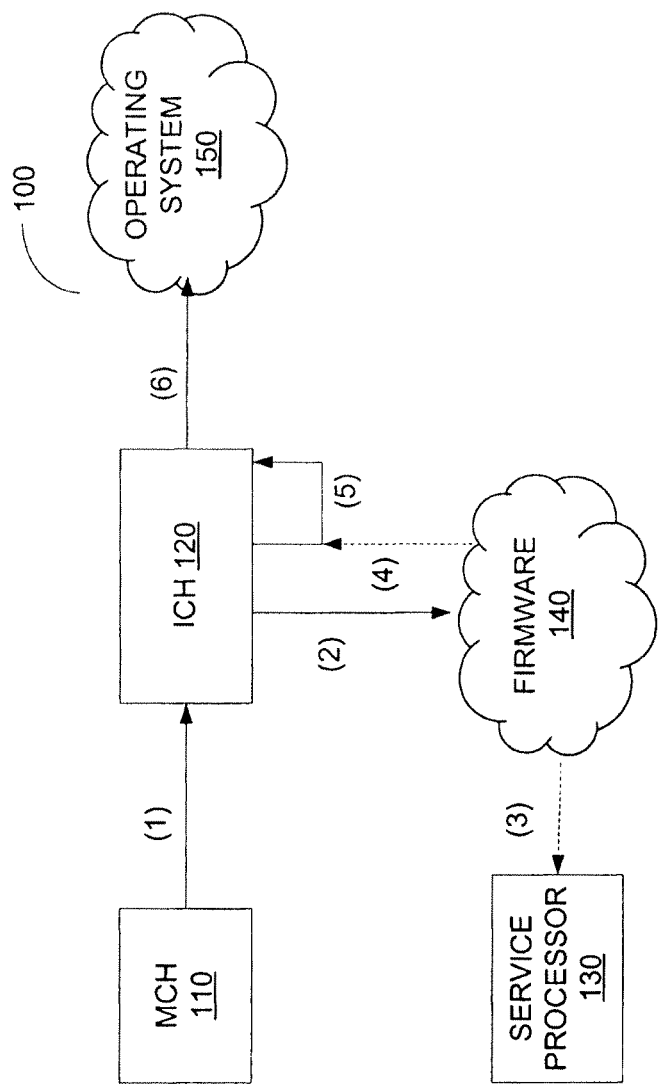
FIG. 1 shows one embodiment of an error architecture for corrected error flow in an exemplary computer system.

FIG. 1 shows one embodiment of an error architecture for corrected error flow in an exemplary computer system. The architecture 100 includes a memory controller hub (MCH) 110, an input/output (I/O) controller huh (ICH) 120, a service processor 130, firmware 140, and an operating system (OS) 150. The MCH 110 is operatively coupled to the ICH 120, which is further operatively coupled to the firmware 140 and the as ISO. The firmware 140 is operatively coupled to the service processor 130. The firmware 140 may reside within a basic I/O system (BIOS) of the computer system. Generally speaking, the firmware 140 interfaces with various hardware components in the computer system at various times, such as during initialization of the computer system (a.k.a., booting up), interrupts, etc.

Note that any or all of the components and the associated hardware illustrated in FIG. 1 may be used in various embodiments of the computer system. However, it should be appreciated that other configurations of the computer system may include one or more additional devices not shown in FIG. 1.

In some embodiments, the computer system may adopt an error handling standard, which defines a common error record format. However, the OS 150 being executed in the computer system may still handle errors in a different way specific to the as OS 150. In order to support the as OS 150, the firmware 140 is used to abstract error information for the as OS 150. As discussed herein, to abstract error information for the as 150 broadly refers to the process of collecting and converting error information from disparate sources in the platform into a format usable by the as OS 150. For instance, abstracted error access registers may be presented to the as OS 150. These registers are used to provide the as OS 150 and/or higher level software access to error information in the platform. The OS 150 and/or higher level software accesses these registers to get to the error information on the platform. However, these registers when accessed by the as OS 150 and/or higher level software may cause system management interrupt (SMI) traps when accessed. This in turn allows the firmware 140 to intervene in the OS's 150 access to error information and abstract the error information gathering on the platform. As such, changes in hardware (e.g., adding silicon gates and platform logic) and OS-specific device drivers are no longer needed to accommodate the as 150. Thus, maintenance and validation cost of the computer system may be reduced. To further illustrate the concept, one embodiment of a corrected error flow is described in details below.

Referring to FIG. 1, a corrected platform error is routed to cause error pin assertion (1). This error pin assertion is then routed to cause SMI (2). In some embodiments, the firmware 140 invokes a platform SMI handler to log the error as needed to service processor 130 (3). Further, the platform SMI handler indentifies the error, gathers the error information from various platforms and silicon-specific registers to construct an error record in the common error record format (4). This error is deposited to a memory buffer (5) visible to the OS 150. Then the platform SMI handler signals the error (6) to the OS 150, thus allowing the OS 150 to access the error information without requiring platform specific knowledge of the error registers.

In some embodiments, uncorrected errors are similarly handled using the firmware 140. For instance, an uncorrected error may cause a SMI trap to occur before signaling a non-maskable error to the computer system. This may allow the firmware 140 to access the platform-specific error registers and/or silicon-specific error registers to construct an error record in the common error record format for consumption by the OS 150.

In addition to handling corrected and/or uncorrected errors the above technique may allow error injection support to be exposed to the OS 150 in an abstracted manner. One embodiment of an error injection interface is illustrated in FIG. 2.

Figure 2:
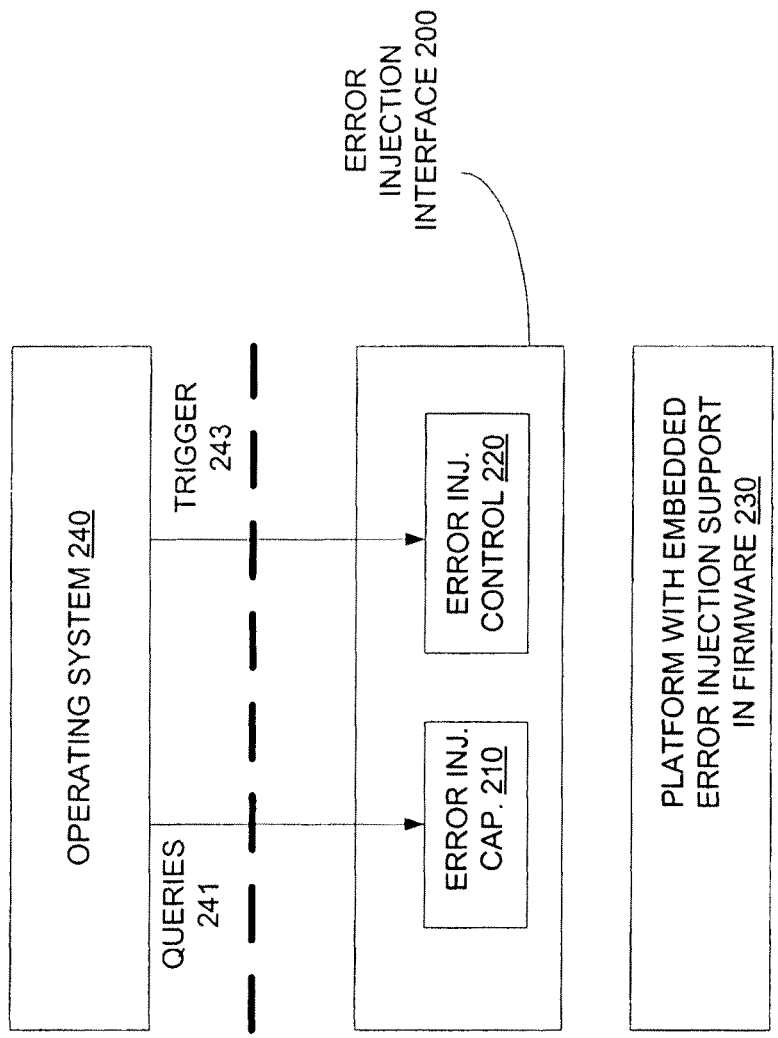
FIG. 2 shows one embodiment of an error injection support scheme.

Referring to FIG. 2, the error injection interface 200 includes error injection capabilities 210 and error injection control 220. The error injection interface 200 sits on top of a platform 230 with embedded error injection support in BIOS. Above the error injection interface 200 is an operating system (OS) 240. The OS 240 may send queries 241 to access the error injection capabilities 210 of the error injection interface 200. Further, the OS 240 may send messages and/or commands 243 to trigger the error injection control 220 within the error injection interface 200.

Figure 3:
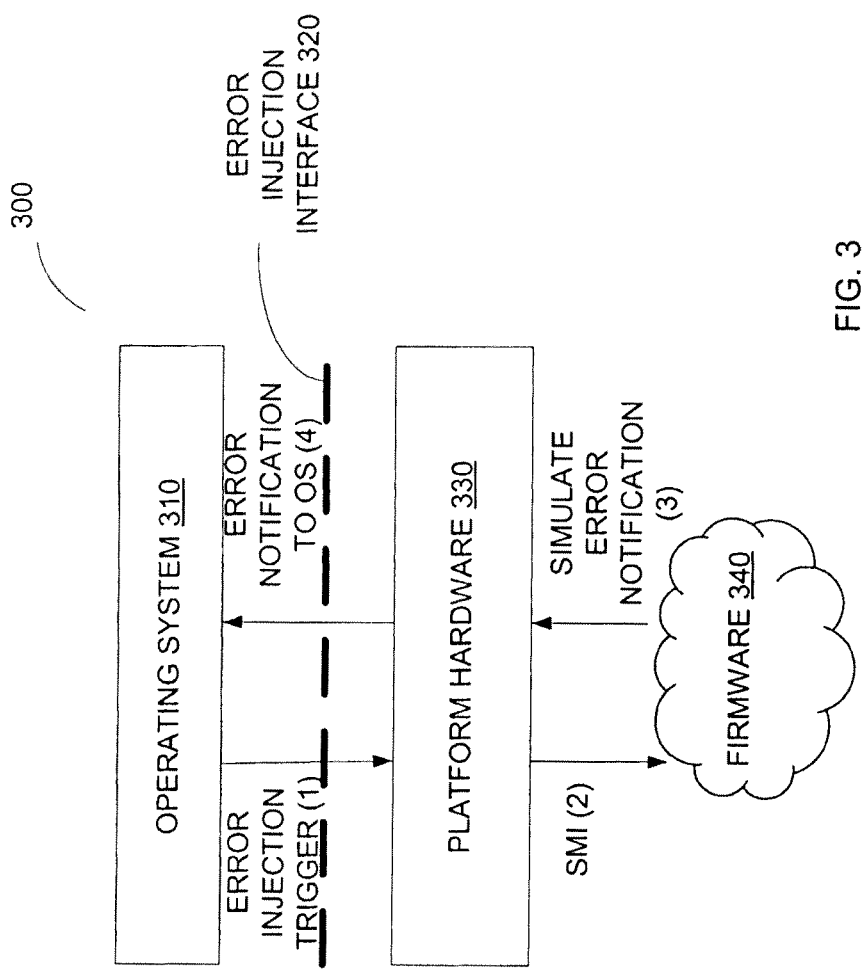
FIG. 3 illustrates one embodiment of an error injection flow in an exemplary computer system.

FIG. 3 illustrates one embodiment of an error injection flow in an exemplary computer system. The exemplary computer system 300 includes an operating system (OS) 310, an error injection interface 320, platform hardware 330 (such as platform-specific or silicon-specific error registers), and firmware 340. The OS 310 is operatively coupled to the error injection interface 320, which is further operatively coupled to the platform hardware 330. The platform hardware 330 is operatively coupled to the firmware 340.

In some embodiments, the OS 310 sends an error injection trigger request (1) to the error injection interface 320. The error injection interface 320 delivers the request (1) to one or more abstracted error registers within the platform hardware 330. Access to the abstracted error registers results in a SMI trap (2) into the system firmware 340. In response to the SMI trap, the firmware 340 invokes a SMI handler to construct an error record in a common error record format and signals the required error condition to the OS 310. As such, error injection may be supported across various vendor platforms and operating systems without having platform and/or silicon specific error injection hooks. After the error record has been constructed, the firmware 340 simulates an error notification (3), which is sent to the platform hardware 330. The platform hardware 330 then sends an error notification (4) to the OS 310 via the error injection interface 320.

Note that the approach discussed above is generally applicable to expose error information (such as error records in the common error record format) to upper layers (e.g., the OS 320) above the platform hardware 330 in a standardized fashion without platform and/or silicon specific hardware hooks. The firmware 340 handles error information in a platform specific manner and abstracts the error information to the upper layers. Furthermore, the above approach improves the security of the platform because providing physical error injection hooks in the platform and/or the silicon may open up potential security holes. For example, malicious exploit of hardware error injection hooks may cause denial of service attacks.

Figure 4:
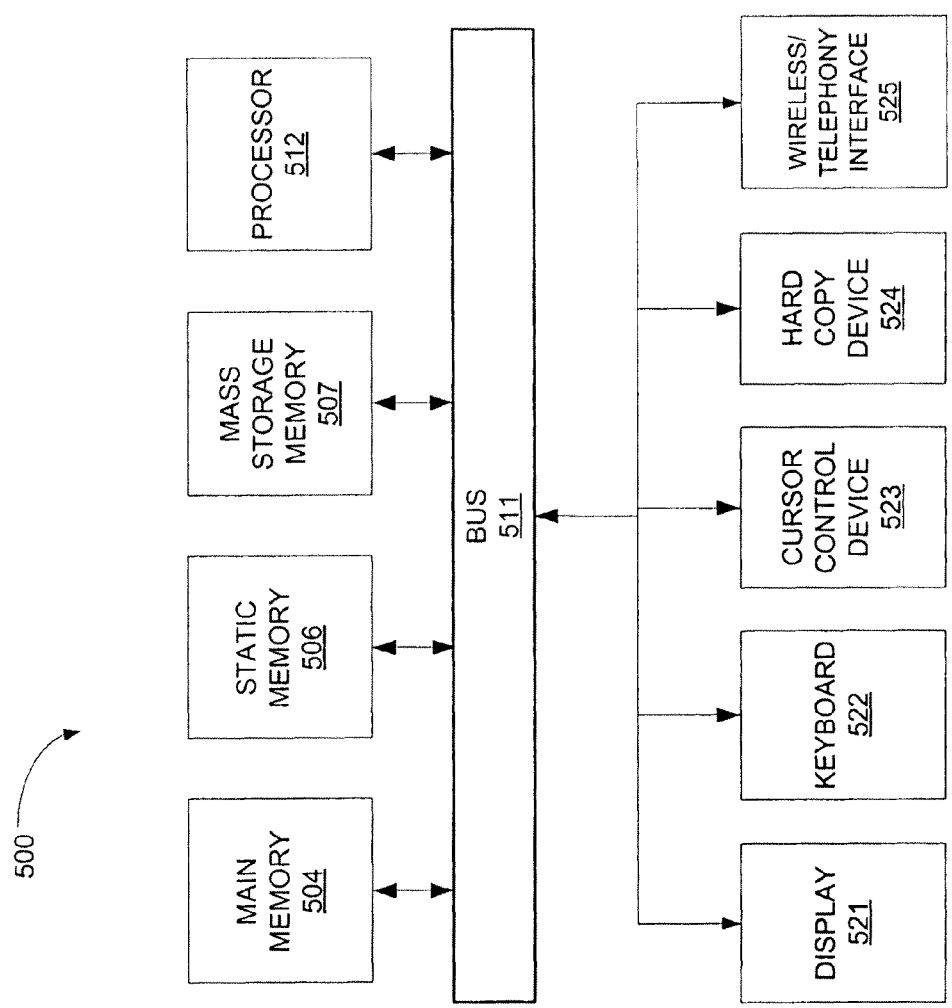
FIG. 4 illustrates an exemplary embodiment of a computing system.

FIG. 4 shows an exemplary embodiment of a computer system 500 usable with some embodiments of the firmware assisted error handling scheme described above. Computer system 500 includes a communication mechanism or bus 511 for communicating information, and a processor 512 coupled with bus 511 for processing information. Processor 512 includes one or more processor cores powered by some embodiments of the power block described above.

Computer system 500 further includes a random access memory (RAM), or other dynamic storage device 504 (referred to as main memory) coupled to bus 511 for storing information and instructions to be executed by processor 512. Main memory 504 also may be used for storing temporary variables or other intermediate information during execution of instructions by processor 512.

Computer system 500 also includes a read only memory (ROM) and/or other static storage device 506 coupled to bus 511 for storing static information and instructions for processor 512, and a data storage device 507, such as a magnetic disk or optical disk and its corresponding disk drive. Mass storage device 507 is coupled to bus 511 for storing information and instructions.

Computer system 500 may further be coupled to a display device 521, such as a cathode ray tube (CRT) or liquid crystal display (LCD), coupled to bus 511 for displaying information to a computer user. An alphanumeric input device 522, including alphanumeric and other keys, may also be coupled to bus 511 for communicating information and command selections to processor 512. An additional user input device is cursor control 523, such as a mouse, trackball, track pad, stylus, or cursor direction keys, coupled to bus 511 for communicating direction information and command selections to processor 512, and for controlling cursor movement on display 521.

Another device that may be coupled to bus 511 is hard copy device 524, which may be used for printing instructions, data, or other information on a medium such as paper, film, or similar types of media. Furthermore, a sound recording and playback device, such as a speaker and/or microphone may optionally be coupled to bus 511 for audio interfacing with computer system 500. Another device that may be coupled to bus 511 is a wired/wireless telephony interface 525 to communicate with a telephone or handheld palm device over a wired or wireless network.

Note that any or all of the components and the associated hardware illustrated in FIG. 4 may be used in various embodiments of the computer system 500. However, it should be appreciated that other configurations of the computer system may include one or more additional devices not shown in FIG. 4. Furthermore, one should appreciate that the technique disclosed above is applicable to different types of system environment, such as a multi-drop environment or a point-to-point environment. Likewise, the disclosed technique is applicable to both mobile and desktop computing systems.

Some portions of the preceding detailed description have been presented in terms of symbolic representations of operations on data bits within a computer memory. These descriptions and representations are the tools used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations described herein. This apparatus may be specially constructed for the required purposes, or it may comprise a general-purpose computer selectively activated or reconfigured by a computer program stored in the computer. Such a computer program may be stored in a machine-accessible storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, embodiments of the present invention are not described with reference to any particular programming language. It will be appreciated that a variety of programming languages may be used to implement the teachings as described herein.

The foregoing discussion merely describes some exemplary embodiments of the present invention. One skilled in the art will readily recognize from such discussion, the accompanying drawings and the claims that various modifications can be made without departing from the spirit and scope of the subject matter.

What is claimed is:

1. A method comprising:
using firmware to abstract error information for an operating system (OS) within a computer system, the error information from disparate sources in the computer system, the error information abstracted from platform specific error registers of one of various different platforms, wherein the disparate sources comprise a central processing unit, memory controller, and input/output controller, and wherein the error information is abstracted from different platform error record formats based on different vendor formats for the central processing unit, memory controller, and input/output controller;
constructing an error record using the error information, the error record in a common error record format useable by the operating system;
depositing the error record into two or more abstracted error access registers comprising memory buffers visible to the OS;
making the error information available to the OS by the firmware presenting to the OS, the two or more abstracted error access registers comprising memory buffers visible to the OS;
the operating system accessing the error record from the two or more abstracted error access registers, without platform specific knowledge of the platform specific error registers; and
using the firmware to support platform error injection, wherein a request to inject errors from the OS is trapped and is fulfilled by the firmware transparently to the OS.

2. The method according to claim 1, wherein constructing an error record comprises translating the error information into the error record; and wherein abstracting, constructing, depositing, and presenting are performed only by the firmware.

3. The method according to claim 1, wherein using the firmware to support platform error injection includes reducing the number of physical error injection hooks from sources other than the firmware.

4. The method according to claim 1, further comprising:
trapping error access to hardware within the computer system; and
using the error access to provide an abstraction in a common error record format.

5. The method according to claim 1, further comprising:
trapping access to hardware within the computer system using the firmware; and
in response to the access trapped, returning the error information in a predetermined format.

6. The method according to claim 1, wherein the firmware:
creates the abstract error information by identifying the error and gathering error information from various platform and silicon-specific registers to construct an error record in a common error record format;
deposits the error record into the memory buffers; and
notifies the operating system to access the error record and correct the error without providing the operating system with platform specific knowledge in the abstracted error access registers.

7. The method according to claim 6, wherein the operating system accesses the error record and corrects the error without platform specific knowledge from the abstracted error access registers.

8. An apparatus comprising:
platform firmware executable on a trap to abstract an interface for error information to an operating system (OS), the error information from disparate sources in the computer system, the error information abstracted from platform specific error registers of one of various different platform, wherein the disparate sources comprise a central processing unit, memory controller, and input/output controller, and wherein the error information is abstracted from different platform error record formats based on different vendor formats for the central processing unit, memory controller, and input/output controller;
two or more platform abstracted error access registers to trap to the platform firmware, wherein the platform firmware is executable to abstract error information for the OS and to make the error information available to the OS by:
constructing an error record using the error information, the error record in a common error record format useable by the operating system;

depositing the error record into two or more platform abstracted error access registers comprising memory buffers visible to the OS;

presenting to the OS, the two or more platform abstracted error access registers comprising memory buffers visible to the OS;

the operating system executable to access the error record from the two or more abstracted error access registers, without platform specific knowledge of the platform specific error registers; and the platform firmware executable to support platform error injection, wherein a request to inject errors from the OS is trapped and is fulfilled by the firmware transparently to the OS.

9. The apparatus of claim 8, wherein constructing an error record comprises translating the error information into the error record; wherein abstracting, constructing, depositing, and presenting are performed only by the platform firmware; and wherein the computer system is coupled to an external printer.

10. The apparatus according to claim 8, wherein the platform firmware executable to support platform error injection includes platform firmware executable to reduce the number of physical error injection hooks from sources other than the firmware.

11. The apparatus of claim 8, wherein the interface comprises an error injection interface having error injection capabilities and an error injection control.

12. The apparatus of claim 8, further comprising:
a service processor, wherein the platform firmware is operable to invoke a system management interrupt (SMI) to log an error to the service processor.

13. The apparatus of claim 8, wherein the platform firmware is executable to:
identify the error and gathers error information from various platform and silicon-specific registers to construct an error record in a common error record format;
deposit the error record into the memory buffers; and
notify the operating system to access the error record and correct the error without providing the operating system with platform specific knowledge in the abstracted error access registers.

14. The apparatus of claim 13, wherein the operating system is executable to access the error record and corrects the error without receiving platform specific knowledge from the abstracted error access registers.

15. A non-transitory machine-accessible medium that provides instructions that, if executed by a processor, will cause the machine to perform operations comprising:
using firmware to abstract error information for an operating system (OS) within a computer system, the error information from disparate sources in the computer system, the error information abstracted from platform specific error registers of one of various different platforms, wherein the disparate sources comprise a central processing unit, memory controller, and input/output controller, and wherein the error information is abstracted from different platform error record formats based on different vendor formats for the central processing unit, memory controller, and input/output controller;
constructing an error record using the error information, the error record in a common error record format useable by the operating system;
depositing the error record into two or more abstracted error access registers comprising memory buffers visible to the OS;
making the error information available to the OS by the firmware presenting to the OS, the two or more abstracted error access registers comprising memory buffers visible to the OS;
the operating system accessing the record from the two or more abstracted error access registers, without platform specific knowledge of the platform specific error registers; and
using the firmware to support platform error injection, wherein a request to inject errors from the OS is trapped and is fulfilled by the firmware transparently to the OS.

16. The machine-accessible medium according to claim 15, wherein
unconstructing an error record comprises translating the error information into the error record; and wherein abstracting, constructing, depositing, and presenting are performed only by the firmware.

17. The machine-accessible medium according to claim 15, wherein using the firmware to support platform error injection includes reducing the number of physical error injection hooks from sources other than the firmware.

18. The machine-accessible medium according to claim 15, wherein constructing an error record comprises translating the error information into the error record; wherein abstracting, constructing, depositing, and presenting are performed only by the firmware; and
wherein the computer system is coupled to an external printer.

19. The machine-accessible medium according to claim 15, wherein the operations further comprise:
trapping error access to hardware within the computer system; and
using the error access to provide an abstraction in a common error record format.

20. The machine-accessible medium according to claim 15, wherein the operations further comprise:
trapping access to hardware within the computer system using the firmware; and
in response to the access trapped, returning the error information in a predetermined format.

21. The machine-accessible medium according to claim 15, wherein the operations further comprise the firmware:
creating the abstract error information by identifying the error and gathering error information from various platform and silicon-specific registers to construct an error record in a common error record format;
depositing the error record into the memory buffers; and
notifying the operating system to access the error record and correct the error without providing the operating system with platform specific knowledge in the abstracted error access registers.

22. The machine-accessible medium according to claim 21, wherein the operations further comprise the operating system accesses the error record and corrects the error without platform specific knowledge from the abstracted error access registers.

23. A method comprising:
using firmware to abstract error information for an operating system (OS) within a computer system, the error information from at least two disparate sources in the computer system, the error information abstracted from platform specific error registers of various different platforms, wherein the different platform error record formats comprise different vendor formats for each of the at least two disparate sources;

constructing an error record using the error information, the error record in a common error record format useable by the operating system;

depositing the error record into two or more abstracted error access registers comprising memory buffers visible to the OS;

making the error information available to the OS by the firmware presenting to the OS, the two or more abstracted error access registers comprising memory buffers visible to the OS;

the operating system accessing the error record from the two or more abstracted error access registers, without platform specific knowledge of the platform specific error registers; and using the firmware to support platform error injection, wherein a request to inject errors from the OS is trapped and is fulfilled by the firmware transparently to the OS.

24. The method according to claim 23, wherein using the firmware to support platform error injection includes reducing the number of physical error injection hooks from sources other than the firmware.

* * * * *